(12) United States Patent
Jambunathan et al.

(10) Patent No.: US 8,726,952 B2
(45) Date of Patent: May 20, 2014

(54) WIRELESS PHONE WALLET

(76) Inventors: Sunder G. Jambunathan, New York, NY (US); Kumar G. Jambunathan, Sunnyvale, CA (US)

(*) Notice: Subject to any disclaimer, the term of this patent is extended or adjusted under 35 U.S.C. 154(b) by 430 days.

(21) Appl. No.: 12/981,090

(22) Filed: Dec. 29, 2010

(65) Prior Publication Data

US 2012/0168483 A1    Jul. 5, 2012

(51) Int. Cl.
*A45C 11/00*    (2006.01)

(52) U.S. Cl.
USPC .............................. 150/147; 150/134; 206/38

(58) Field of Classification Search
USPC ............ 150/112, 133, 134, 147–150; 206/38; 455/575.1
See application file for complete search history.

(56) References Cited

U.S. PATENT DOCUMENTS

| | | | |
|---|---|---|---|
| 5,080,223 A * | 1/1992 | Mitsuyama | 206/39.5 |
| 5,924,136 A * | 7/1999 | Ogean | 2/159 |
| 5,941,375 A * | 8/1999 | Kamens et al. | 206/38 |
| 6,454,146 B2 | 9/2002 | Alis | |
| 6,478,205 B1 | 11/2002 | Fujihashi | |
| 6,616,111 B1 * | 9/2003 | White | 248/309.1 |
| D554,950 S * | 11/2007 | Richmond | D7/653 |
| D626,119 S * | 10/2010 | Fellig | D14/250 |
| D631,246 S * | 1/2011 | Boettner | D3/218 |
| 8,047,364 B2 * | 11/2011 | Longinotti-Buitoni | 206/320 |
| 8,381,904 B1 * | 2/2013 | Longinotti-Buitoni | 206/320 |
| 2003/0000865 A1 * | 1/2003 | Carlino | 206/581 |
| 2005/0133130 A1 * | 6/2005 | Blum et al. | 150/149 |
| 2007/0057004 A1 | 3/2007 | Butler et al. | |
| 2008/0121322 A1 | 5/2008 | Thomson | |
| 2010/0294405 A1 * | 11/2010 | Longinotti-Buitoni | 150/165 |
| 2011/0272072 A1 * | 11/2011 | Westover et al. | 150/147 |

* cited by examiner

*Primary Examiner* — Sue A Weaver
(74) *Attorney, Agent, or Firm* — Patent Law Group LLP; David C. Hsia

(57) ABSTRACT

A wallet for a handheld device includes a base having a front and a back, an elastic pocket fixed to the front of the base, an adhesive on the back of the flexible base, and an adhesive backing over the adhesive. The elastic pocket is stretchable to accommodate multiple cards and folded bills. The elastic pocket is made of a different material than the base.

10 Claims, 7 Drawing Sheets

WIRELESS PHONE WALLET

FIELD OF INVENTION

This invention relates to add-on wallets for handheld devices, such as wireless phones, and methods for adding wallets to the handheld devices.

DESCRIPTION OF RELATED ART

Wireless phones and wallets are indispensible part of modern life. What are needed are apparatus and methods that combine their functionalities to reduce the number of items a person carries.

SUMMARY

In one or more embodiment of the present disclosure, a wallet for a handheld device includes a base having a front and a back, an elastic pocket fixed to the front of the base, an adhesive on the back of the flexible base, and a backing over the adhesive. The elastic pocket is stretchable to accommodate multiple cards and folded bills. The elastic pocket is made of a different material than the base.

BRIEF DESCRIPTION OF THE DRAWINGS

In the drawings.

Use of the same reference numbers in different figures indicates similar or identical elements.

DETAILED DESCRIPTION

Figure 1:
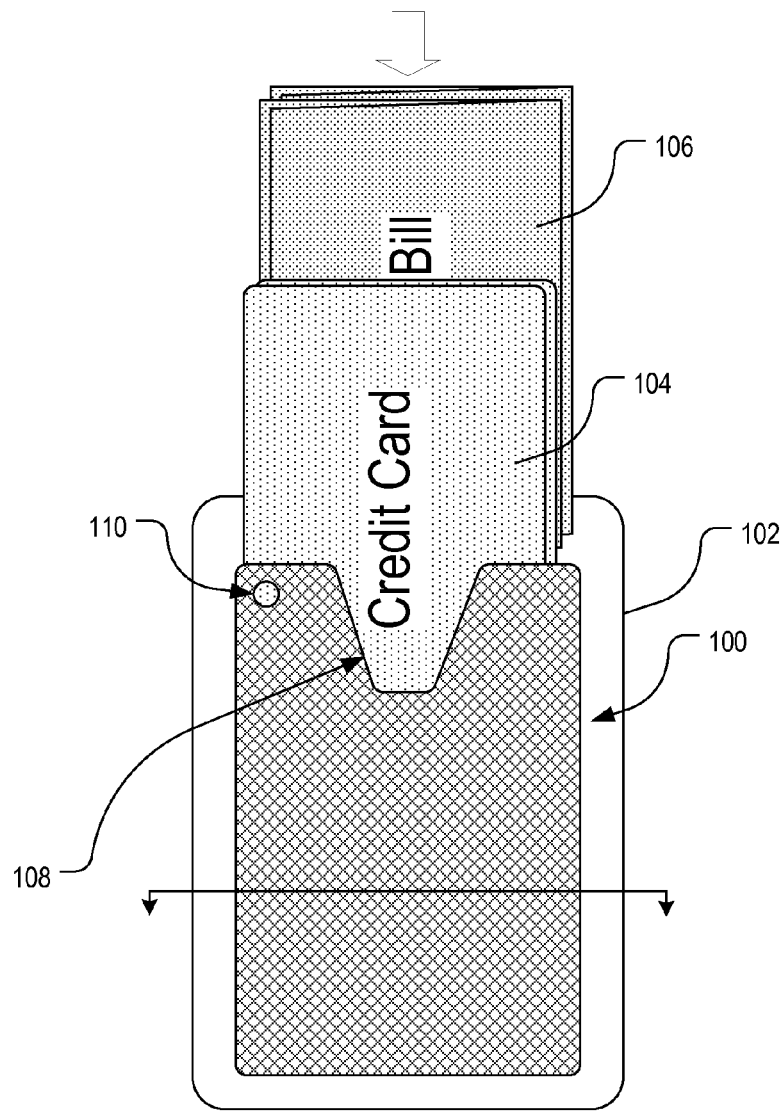
FIG. 1 shows a back view of a self-adhesive wallet fixed to a wireless phone in one or more embodiments of the present disclosure.

FIG. 1 shows a back view of a self-adhesive wallet 100 fixed to a wireless phone 102 in one or more embodiments of the present disclosure. Wallet 100 has the capacity to hold multiple cards 104 and multiple folded bills 106 for the user, thereby eliminating the need for the user to carry a wallet separate from wireless phone 102. Wireless phone 102 may be an iPhone®, a Blackberry® device, or another wireless device. Cards 104 may be identification cards such as driver's license, credit cards, debit cards, smart cards, and RFID cards. Cards 104 typically meet the size and the thickness specified for ID-1 format by ISO/IEC 7810 and 7813, which is 85.60 by 53.98 mm in size and 0.76 mm in thickness.

Wallet 100 has an opening on the top perimeter side and is closed on the other three perimeter sides. The top opening includes a thumb notch 108 for easy removal of cards 104 and folded bills 106. Wallet 100 may have one or more access holes 110 when the placement of the wallet obstructs any camera, microphone, and speaker built into wireless phone 102. Wallet 100 may be made of transparent materials so as not be obstruct the camera.

Figure 2:
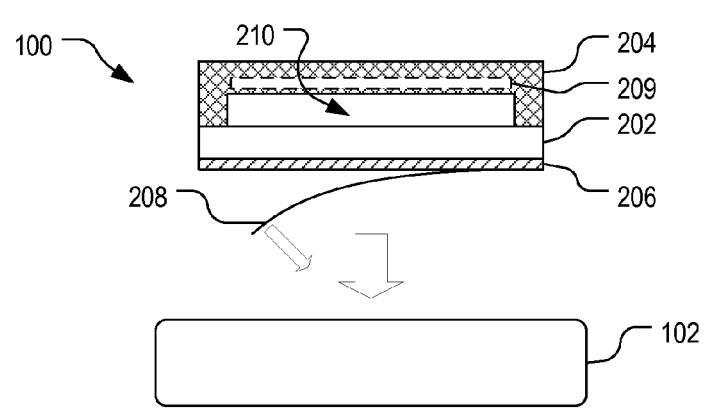
FIG. 2 shows a side cross-sectional view of the construction and the process of applying wallet of FIG. 1 in one or more embodiments of the present disclosure.

FIG. 2 shows a side cross-sectional view of the construction and the application of wallet 100 in one or more embodiments of the present disclosure. Wallet 100 includes a base 202, an elastic pocket 204, a layer of adhesive 206, and a backing 208. Base 202 is made of a flexible material so it can conform to the shape of wireless phone 102. For example, base 202 is made of a flexible material such as plastic. Wallet 100 may include a thin metal film 209, which is used to shield cards 104 from electronic scanning (theft) of information on the cards. Metal film 209 may be embedded in elastic pocket 204 or otherwise attached wallet 100.

Elastic pocket 204 is dimensioned to be slightly larger than a standard credit or ID card. Elastic pocket 204 is fixed on three sides to the front of base 202 to provide an opening to an interior compartment 210 for holding cards 104 and folded bills 106. Elastic pocket 204 may be bonded or sewed onto base 202. Elastic pocket 204 maintains a low profile and stretches as necessary to hold multiple cards 104 and multiple folded bills 106 so they do not fall out of wallet 100. Elastic pocket 204 is made of a different material than base 202. For example, elastic pocket 204 is made of a flexible material such as rubber or spandex. Elastic pocket 204 may have a smooth exterior so it can be removed from one's pocket, briefcase, bag, or purse without snagging. Elastic pocket 204 may have a tacky interior so cards 104 and folded bills 106 do not fall out of wallet 100.

Adhesive 206 with backing 208 is disposed on the back of base 202. Adhesive 206 can be any common adhesive used to permanently or semi-permanently affix objects. Backing 208 is removed prior to fixing wallet 100 to wireless phone 102. Wallet 100 has a smaller footprint than the mobile phone 102.

Figure 3:
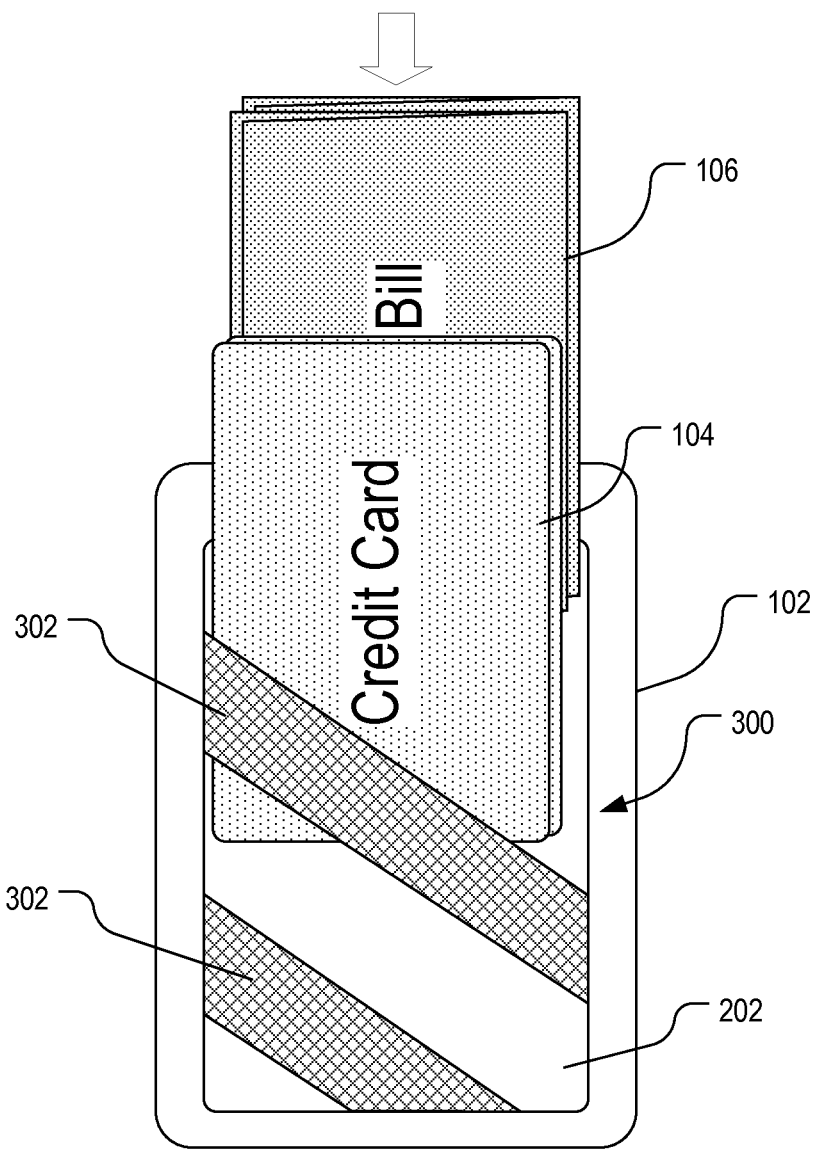
FIG. 3 shows a back view of another self-adhesive wallet fixed to a wireless phone in one or more embodiments of the present disclosure.

FIG. 3 shows a back view of a self-adhesive wallet 300 fixed to wireless phone 102 in one or more embodiments of the present disclosure. Wallet 300 is a variation of wallet 100 (FIG. 1). Instead of an elastic pocket 204 made of a single piece of material as in wallet 100, wallet 300 has elastic straps 302 that crosses between two or more perimeter sides of base 202. Like elastic pocket 204, elastic straps 302 maintains a low profile and stretches as necessary to hold multiple cards 104 and multiple folded bills 106. Elastic straps 302 are made of similar material as elastic pocket 204. Elastic straps 302 may also have a smooth exterior and a tacky interior.

Figure 4:
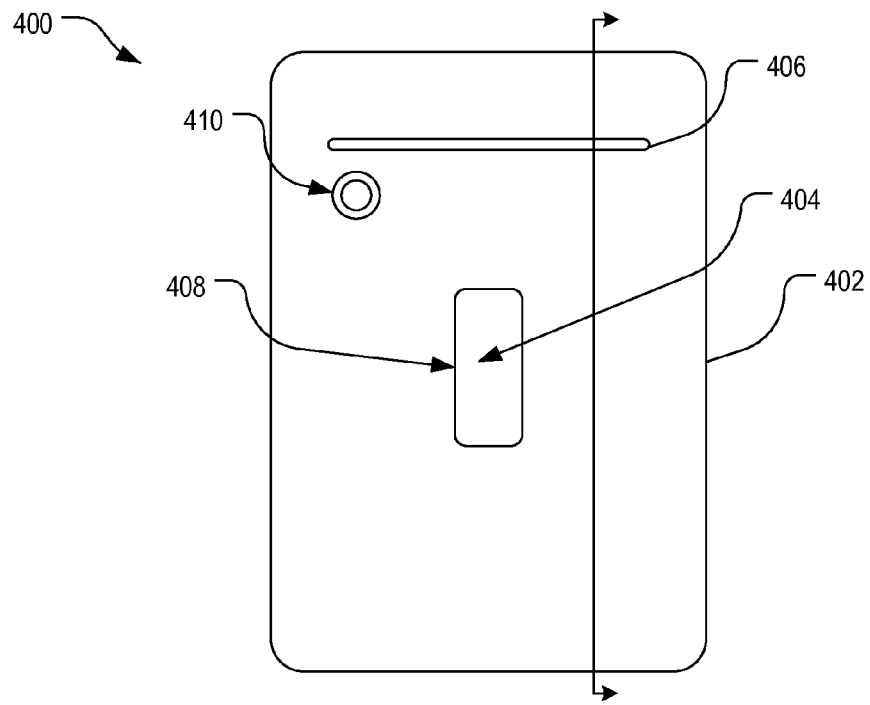
FIG. 4 shows back view of a wallet case for a wireless phone in one or more embodiments of the present disclosure.
Figure 5:
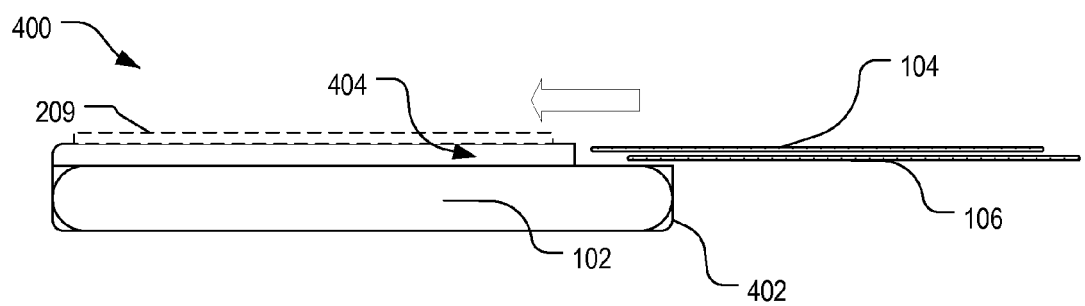
FIG. 5 shows a side cross-sectional view of the wallet of FIG. 4 in one or more embodiments of the present disclosure.

FIGS. 4 and 5 show a back view and a side cross-sectional view of a wallet case 400 for wireless phone 102 (FIG. 5) in one or more embodiments of the present disclosure. Wallet case 400 includes a main body 402 that secures to wireless phone 102 and leaves the displays and the keys accessible to the user. Main body 402 is dimensioned according to wireless phone 102. Main body 402 defines an interior compartment 404 to hold multiple cards 104 and multiple folded bills 106. Wallet case 400 optionally includes thin metal film 209, which is used to shield cards 104 from electronic scanning (theft) of information on the cards. Metal film 209 may be fixed to the top of main body 402 above compartment 404.

The width and height of interior compartment 404 are dimensioned to be slightly larger than those of a standard credit or ID card, and the depth of the interior compartment is dimensioned to accommodate two or more cards 104 and/or two or more folded bills 106. A top slot 406 provides access to interior compartment 404, and a vertical thumb slot 408 to the interior compartment allows easy removal of cards 104 and folded bills 106. Wallet 400 has one or more access holes 410 for any camera, microphone, and speaker built into wireless phone 102.

Figure 6:
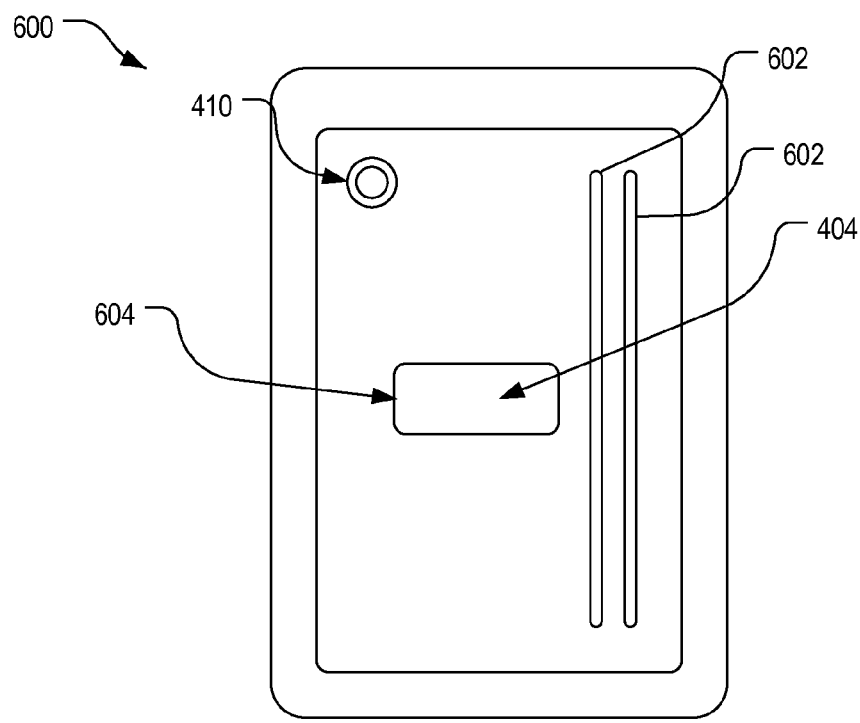
FIG. 6 shows a back view of another wallet case for a wireless phone in one or more embodiments of the present disclosure.

FIG. 6 shows a back view of a wallet case 600 for wireless phone 102 in one or more embodiments of the present disclosure. Wallet case 600 is a variation of wallet case 400 (FIGS. 4 and 5). Instead of a top slot 406 as in wallet case 400, one or more side slots 602 provide access to interior compartment 404. Instead of a vertical thumb slot opening 408 as in wallet case 400, a horizontal thumb slot 604 allows easy removal of cards 104 and folded bills 106.

Figure 7:
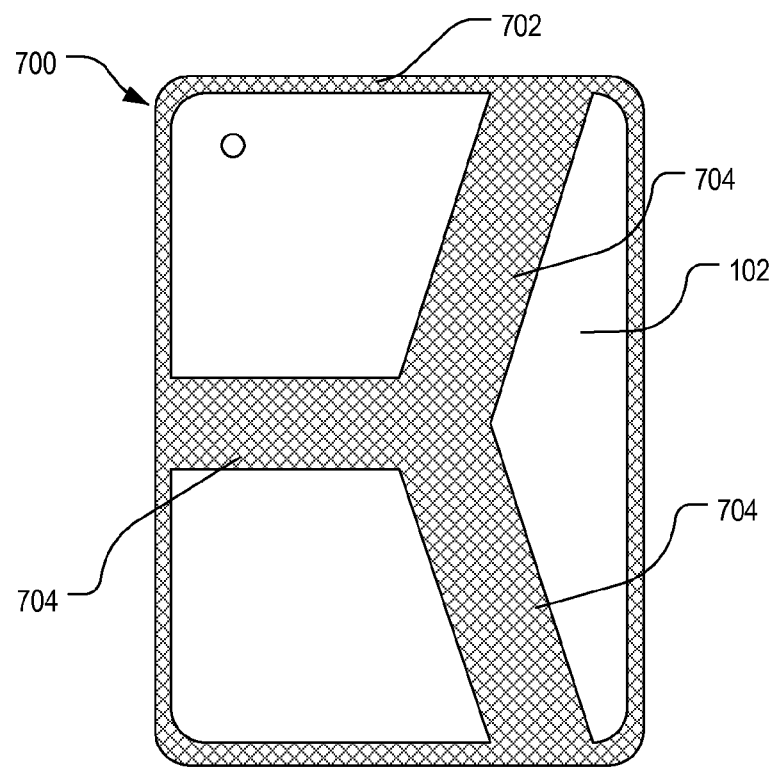
FIGS. 7 and 8 show back views of a strap wallet secured to a wireless phone in one or more embodiments of the present disclosure.
Figure 8:
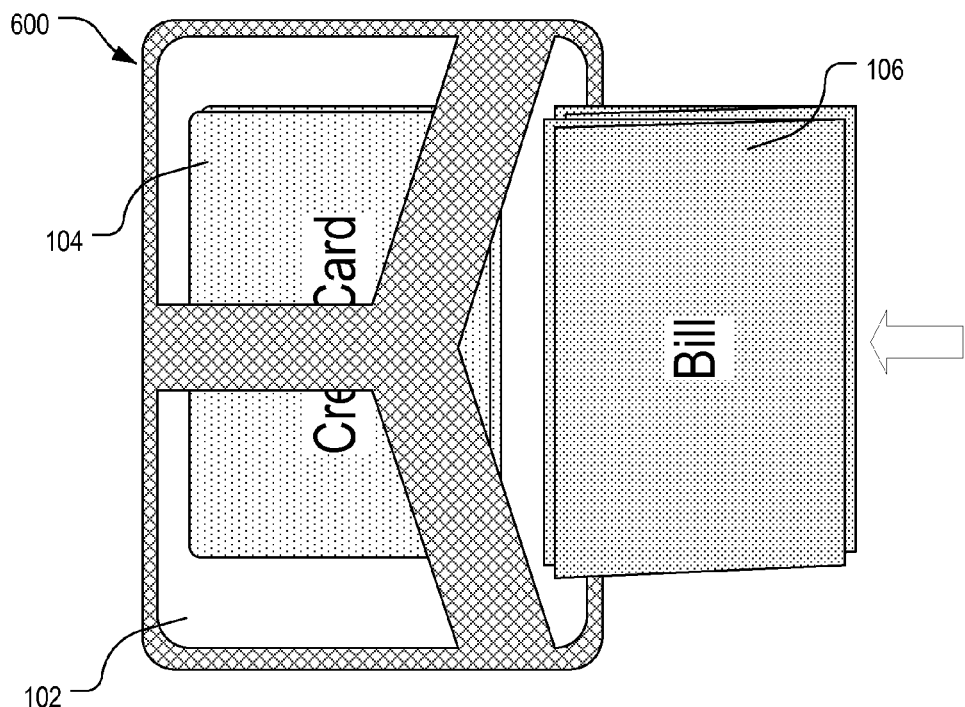

FIGS. 7 and 8 show back views of a strap wallet 700 secured to wireless phone 102 in one or more embodiments of the present disclosure. Strap wallet 700 includes an elastic primary strap 702 and elastic cross straps 704. Elastic primary strap 702 securely wraps around the perimeter of wireless phone 102. Elastic cross straps 704 form a pattern across primary strap 702 to hold multiple cards 104 and folded bills 106. For example, cross straps 704 form a Y-pattern.

Elastic straps 704 maintain a low profile and stretches as necessary to hold multiple cards 104 and multiple folded bills 106. Elastic straps 702 and 704 may have a smooth exterior so it can be easily removed from one's pocket, briefcase, bag, or purse without snagging. Elastic straps 702 and 704 may have a tacky interior so the former grips wireless phone 102 and the latter prevents cards 104 and folded bills 106 from falling out of strap wallet 700. For example, elastic straps 702 and 704 are made of a flexible material such as rubber or spandex.

Figure 9:
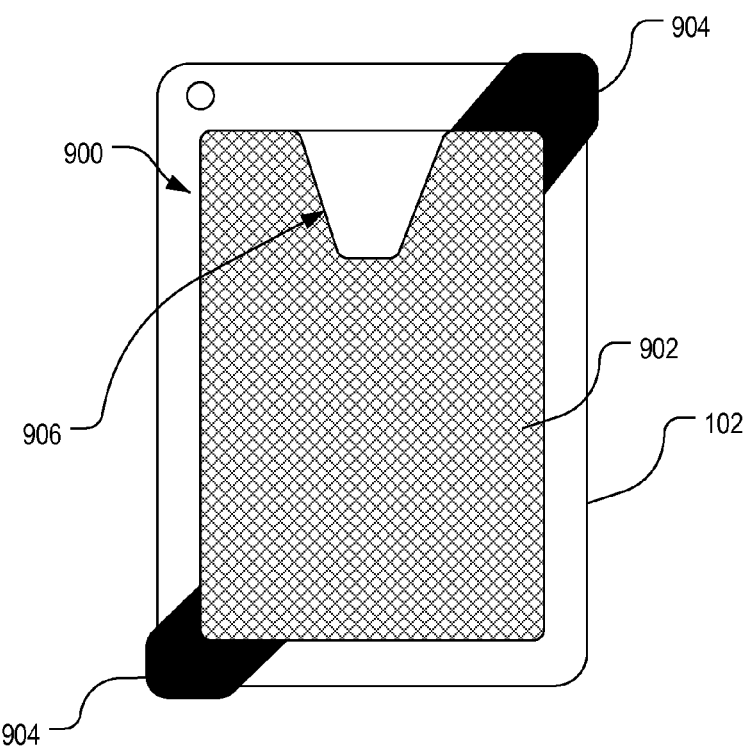
FIG. 9 shows a back view of a wallet secured to a wireless phone in one or more embodiments of the present disclosure.
Figure 10:
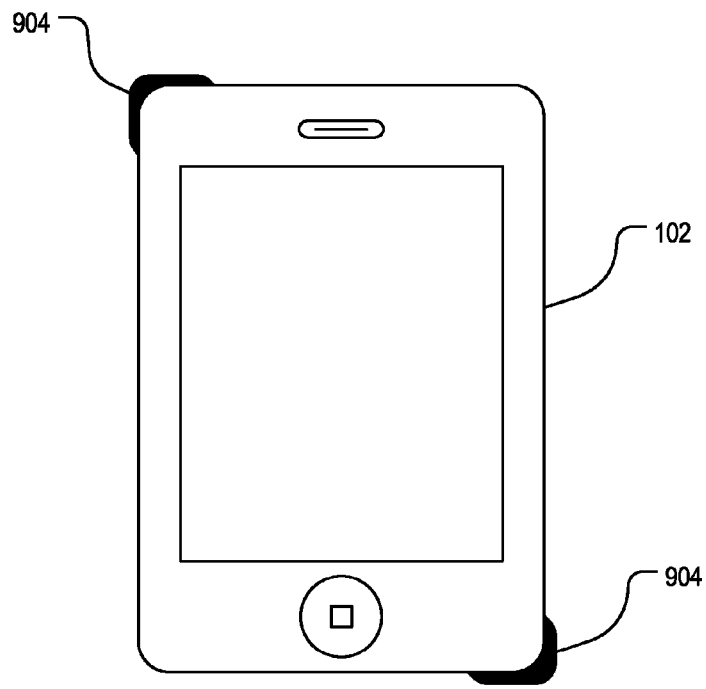
FIG. 10 shows a front view of the wallet of FIG. 9 in one or more embodiments of the present disclosure.

FIGS. 9 and 10 show back and front views of a wallet 900 secured to wireless phone 102 in one or more embodiments of the present disclosure. Wallet 900 has a pocket 902 and elastic grips 904 that extend at opposite corners of the pocket. Pocket 902 is dimensioned to be slightly larger than a standard credit or ID card. Pocket 902 has an opening with a thumb notch 906 for easy removal of cards 104 and folded bills 106. Pocket 902 may be made of an elastic material to maintain a low profile and stretches as necessary to hold multiple cards 104 and multiple folded bills 106. For example, pocket 902 is made of a flexible material such as rubber or spandex. Elastic grips 904 are bonded or sewed onto pockets 902. Elastic grips 904 are stretched and fitted over opposite corners of wireless phone 102 to secure wallet 900 using tension and friction. For example, elastic grips 904 are made of a flexible material such as rubber. Wallet 900 may have one or more access holes when the placement of the wallet obstructs any camera, microphone, and speaker built-into wireless phone 102. Wallet 900 may include a thin metal film, which is used to shield cards 104 from electronic scanning (theft) of information on the cards. The metal film may be embedded in elastic pocket 902 or otherwise attached wallet 900.

Figure 11:
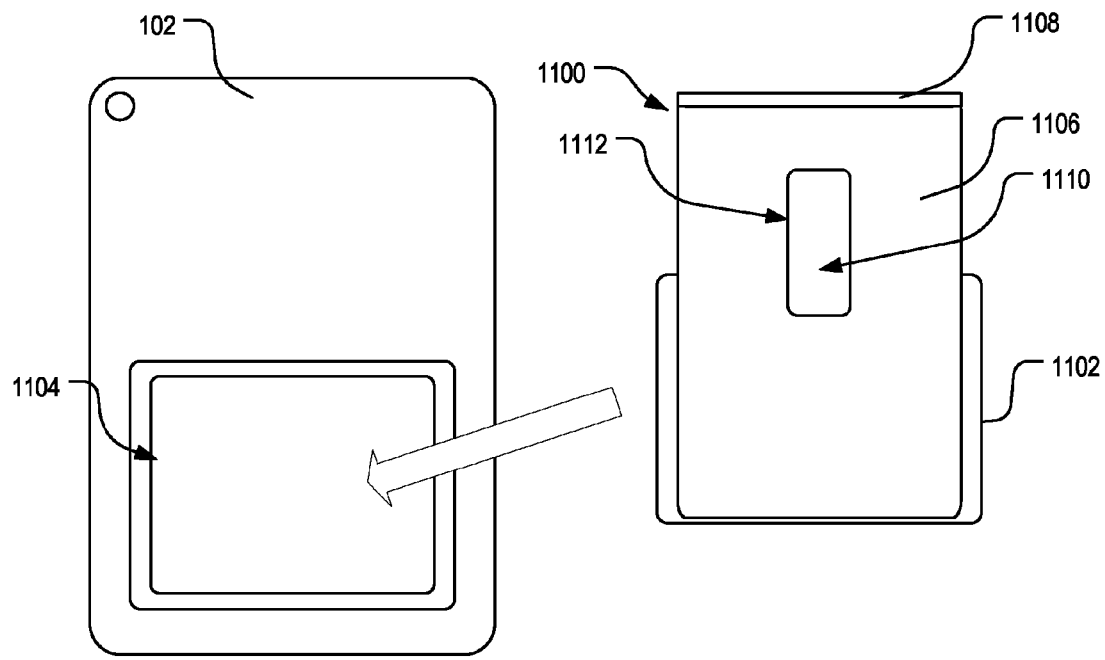
FIG. 11 shows a back view of a battery cover wallet for a wireless phone and the process of applying the battery cover wallet in one or more embodiments of the present disclosure.

FIG. 11 shows a back view of a battery cover wallet 1100 for wireless phone 102 in one or more embodiments of the present disclosure. Battery cover wallet 1100 integrates the functions of a battery cover and a wallet. Battery cover wallet 1100 includes a battery cover 1102 that fits a battery compartment 1104 of wireless phone 102, and a pocket 1106 for holding multiple cards 104 and folded bills 106.

A top slot 1108 provides access to an interior compartment 1110, and a vertical thumb slot 1112 to the interior compartment allows easy removal of cards 104 and folded bills 106. The width and height of interior compartment 1110 are dimensioned to be slightly larger than those of a standard credit or ID card, and the depth of the interior compartment is dimensioned to accommodate two or more cards 104 and/or two or more folded bills 106. Battery cover wallet 1100 may include one or more access holes for any camera, microphone, and speaker built-into wireless phone 102. Battery cover wallet 1100 may include a thin metal film, which is used to shield cards 104 from electronic scanning (theft) of information on the cards. The metal film may be fixed to the top of pocket 1106 above compartment 1110.

Figure 12:
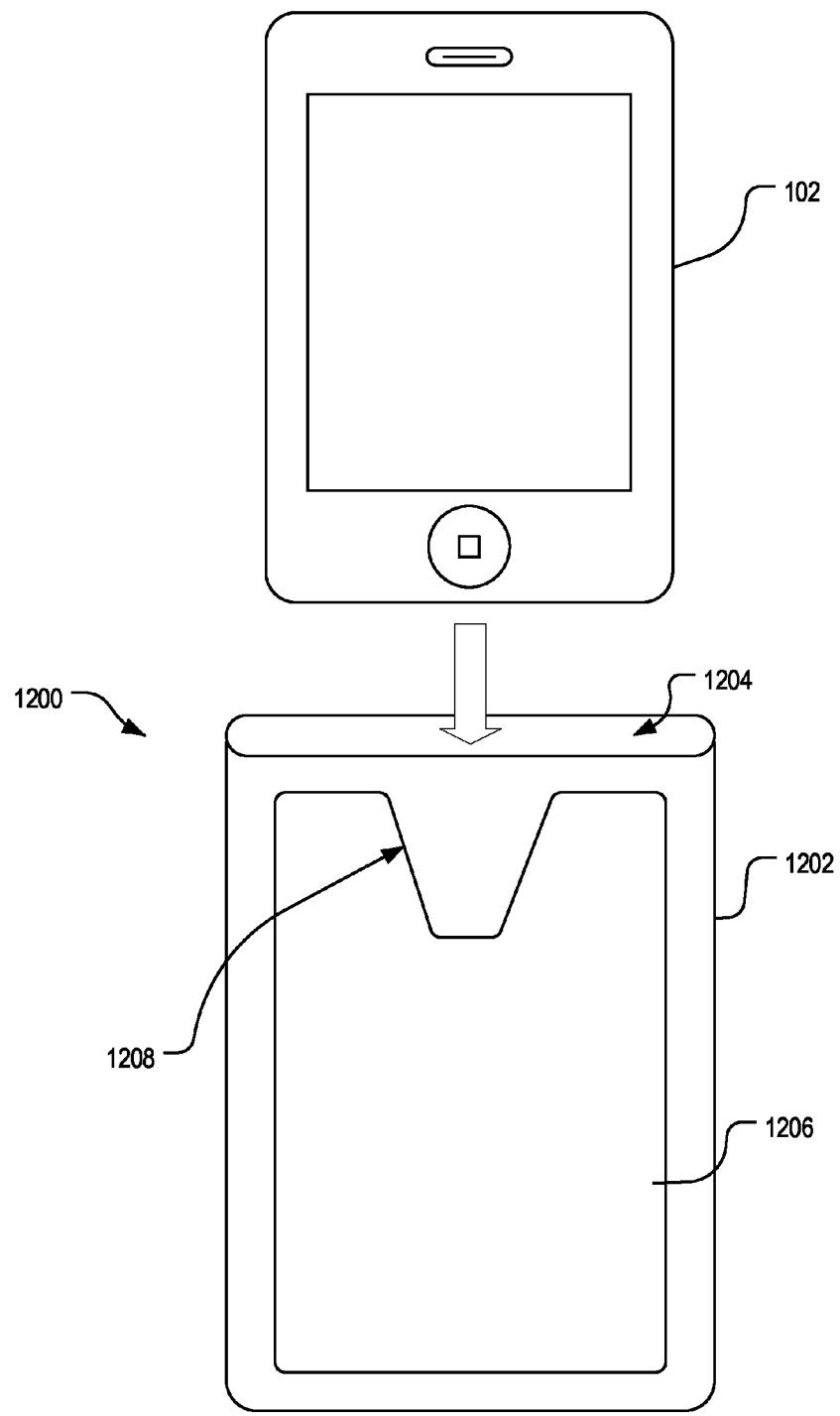
FIG. 12 shows a front view of a sleeve wallet for a wireless phone and the process of applying the sleeve wallet in one or more embodiments of the present disclosure.

FIG. 12 shows a front view of a sleeve wallet 1200 for wireless phone 102 in one or more embodiments of the present disclosure. Sleeve wallet 1200 includes a sleeve 1202 with a top opening 1204, and a pocket 1206 fixed to the sleeve. Sleeve 1202 and pocket 1206 are made of elastic fabric, and the pocket is sewn onto the sleeve. For example, sleeve 1202 and pocket 1206 can be made of spandex. Wireless phone 102 slides into sleeve 1202 for protection and slide out from the sleeve for use. Pocket 1206 is dimensioned to be slightly larger than a standard credit or ID card. Pocket 1206 holds multiple cards 104 and folded bills 106. Pocket 1206 includes a thumb notch 1208 at its opening for easy removal of cards 104 and folded bills 106. Sleeve wallet 1200 may include a thin metal film, which is used to shield cards 104 from electronic scanning (theft) of information on the cards. The metal film may be embedded in elastic pocket 1206 or otherwise attached wallet 1200.

Various other adaptations and combinations of features of the embodiments disclosed are within the scope of the present disclosure. Numerous embodiments are encompassed by the following claims.

What is claimed is:

1. A self-adhesive wallet for a mobile phone, the wallet having a smaller footprint than the mobile phone, the wallet comprising:
   a base having a front and a back;
   an elastic pocket on the front of the base, the elastic pocket being stretchable to securely hold multiple cards and folded bills, the elastic pocket being a different material than the base;
   an adhesive on the back of the base to affix the wallet to the mobile phone; and
   an adhesive backing over the adhesive to be removed prior to affixing the wallet to the mobile phone.

2. The wallet of claim 1, wherein the elastic pocket is flush with the base on three perimeter sides of the wallet to define a pocket opening that spans the width of the wallet.

3. The wallet of claim 2, wherein the elastic pocket defines a notch on one side that forms part of the opening of the wallet.

4. The wallet of claim 1, wherein the base comprises a semi-rigid material, and the elastic pocket comprises an elastic material.

5. The wallet of claim 4, wherein the base comprises plastic, and the elastic pocket comprises rubber or spandex.

6. The wallet of claim 1, wherein the elastic pocket has a tacky inner surface and a smooth outer surface.

7. The wallet of claim 1, wherein the base and the elastic pocket define one or more holes opposite of one or more of a camera, a microphone, and a speaker on the mobile phone.

8. The wallet of claim 1, wherein the base and the elastic pocket comprise substantially transparent material.

9. The wallet of claim 1, further comprising a metal film for shielding the cards.

10. The wallet of claim 9, wherein the metal film is embedded in the elastic pocket.

* * * * *